US00RE41765E

(19) United States
(12) Reissued Patent
Gregory et al.

(10) Patent Number: US RE41,765 E
(45) Date of Reissued Patent: Sep. 28, 2010

(54) VARIABLE TEMPERATURE SEAT

(75) Inventors: Christian T. Gregory, La Crescenta, CA (US); David R. Noles, Los Angeles, CA (US); David F. Gallup, Daly City, CA (US); David H. Heller, Cypress, CA (US)

(73) Assignee: Amerigon Incorporated, Northville, MN (US)

(21) Appl. No.: 09/996,439

(22) Filed: Nov. 28, 2001

Related U.S. Patent Documents

Reissue of:
(64) Patent No.: 5,597,200
Issued: Jan. 28, 1997
Appl. No.: 08/156,562
Filed: Nov. 22, 1993

U.S. Applications:

(63) Continuation of application No. 09/239,054, filed on Jan. 27, 1999, now abandoned.

(51) Int. Cl.
*A47C 7/74* (2006.01)

(52) U.S. Cl. ..... 297/180.13; 297/452.47; 5/653

(58) Field of Classification Search ..... 297/180.1, 297/180.13, 180.14, 452.42, 452.46, 452.47; 5/468, 469, 653, 654
See application file for complete search history.

(56) References Cited

U.S. PATENT DOCUMENTS

| | | | |
|---|---|---|---|
| 1,541,213 | A | 6/1925 | Harley |
| 2,782,834 | A | 2/1957 | Vigo |
| 2,826,135 | A | 3/1958 | Benzick |
| 2,912,832 | A | 11/1959 | Clark |
| 2,978,972 | A | 4/1961 | Hake |
| 2,992,604 | A | 7/1961 | Trotman et al. |
| 3,030,145 | A | 4/1962 | Kottemann |
| 3,136,577 | A | 6/1964 | Richard |
| 3,162,489 | A | 12/1964 | Trotman |
| 3,209,380 | A | 10/1965 | Watsky |
| 3,550,523 | A | 12/1970 | Segal |
| 3,785,165 | A | 1/1974 | Valenzuela, Jr. |
| 4,002,108 | A | 1/1977 | Drori |
| 4,065,936 | A | 1/1978 | Fenton et al. |

(Continued)

FOREIGN PATENT DOCUMENTS

| | | |
|---|---|---|
| EP | 0 411 375 | 2/1991 |
| JP | 53-080603 | * 12/1976 |
| JP | 54-097212 | * 12/1977 |
| JP | 51-162223 | * 7/1978 |
| JP | 54-97212 | 7/1979 |

(Continued)

OTHER PUBLICATIONS

Feher, Steve, Thermoelectric Air Conditioned Variable Temperature Seat (VTS) & Effect Upon Vehicle Occupant Comfort, Vehicle Energy Efficiency, and Vehicle Environment Compatibility, SAE Technical Paper, Apr. 1993, pp. 341–349.

(Continued)

*Primary Examiner*—Peter R. Brown
(74) *Attorney, Agent, or Firm*—Knobbe, Martens, Olson & Bear, LLP

(57) ABSTRACT

A seating construction with a plurality of plenums into which is received temperature conditioned air. The air passes through the seat via a plurality of channels formed in the foam of the seat cushion. The air then migrates through a reticulated foam layer that is itself covered with an air permeable layer of material. The reticulated foam and stitching of the seat fabric facilitate diffusion of the air from the foam channel conduits. The air then convectively circulates against and near the occupant of the seat to facilitate climate control around the occupant.

19 Claims, 6 Drawing Sheets

[new]

U.S. PATENT DOCUMENTS

| | | | | |
|---|---|---|---|---|
| 4,379,352 | A | | 4/1983 | Hauslein et al. |
| 4,413,857 | A | | 11/1983 | Hayashi |
| 4,563,387 | A | | 1/1986 | Takagi et al. |
| 4,572,430 | A | | 2/1986 | Takagi et al. |
| 4,685,727 | A | | 8/1987 | Cremer et al. |
| 4,777,802 | A | | 10/1988 | Feher |
| 4,923,248 | A | | 5/1990 | Feher |
| 5,002,336 | A | | 3/1991 | Feher |
| 5,016,302 | A | | 5/1991 | Yu |
| 5,106,161 | A | | 4/1992 | Meiller |
| 5,117,638 | A | | 6/1992 | Feher |
| 5,172,564 | A | | 12/1992 | Reedy |
| 5,226,188 | A | | 7/1993 | Liou |
| 5,385,382 | A | | 1/1995 | Single, II et al. |
| 6,685,553 | B2 | * | 2/2004 | Aoki |

FOREIGN PATENT DOCUMENTS

| | | | |
|---|---|---|---|
| JP | 52-171104 | * | 7/1979 |
| JP | 58-185952 | * | 6/1982 |
| JP | 58-185952 | | 10/1983 |
| JP | 57-081630 | * | 12/1983 |
| JP | 60-12095 | | 1/1985 |
| JP | 61-194354 | | 12/1986 |
| JP | 62-107762 | | 7/1987 |
| JP | 62-191212 | | 8/1987 |
| JP | 1-172012 | | 7/1989 |
| JP | 5-623 | | 1/1993 |
| JP | 5-23235 | | 2/1993 |
| JP | 5023235 | | 2/1993 |
| JP | 5-10700 | | 3/1993 |
| JP | 05-213056 | | 8/1993 |
| JP | 05-277020 | | 10/1993 |

OTHER PUBLICATIONS

The cover sheet of U.S. Patent No. 5,597,200.

The PTO–1449 forms submitted in U.S. Appl. No. 09/239,054.

* cited by examiner

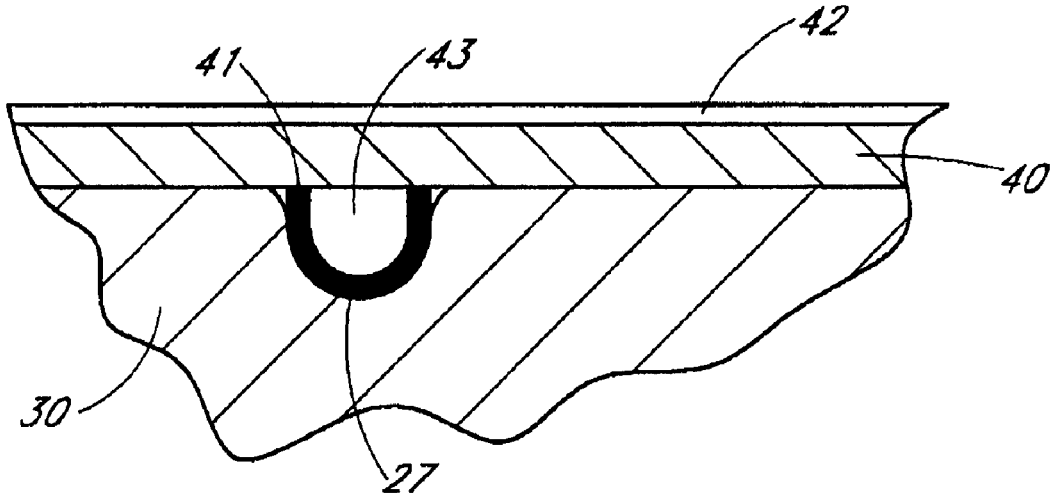
FIG. 5A [new]

VARIABLE TEMPERATURE SEAT

Matter enclosed in heavy brackets [ ] appears in the original patent but forms no part of this reissue specification; matter printed in italics indicates the additions made by reissue.

*Related Applications: The present application is a continuation of prior application Ser. No. 09/239,054, filed Jan. 27, 1999.*

BACKGROUND OF THE INVENTION

1. Field of the Invention

The invention provides a method and apparatus for climate control of an individualized occupant seat In the practice of this invention, there is a method and apparatus for providing conditioned air to a vehicle seat's occupant. Conditioned air is obtained from a central source in the vehicle and is channeled through the seat. The air is then separated into a plurality of smaller subchannels via a manifold. The air is then further divided up, i.e., diffused, through a layer of reticulated foam. This reticulated foam takes the place of the upholstery backing foam that is normally used in a vehicle seat. The air passes through the foam, both perpendicular to, as well as parallel with, the seat cushion surface. The air, in exiting the reticulated foam, is directed through the seat covering. The air provides for heating and cooling of the vehicle seat's occupant 2. Prior Art Temperature modified air for environmental control of living or working space is typically provided to relatively extensive areas, such as entire buildings, selected offices, or suites of rooms within a building. In the case of vehicles, such as automobiles, the entire vehicle is cooled or heated as a unit. There are many situations, however, in which more selective or restrictive air temperature modification is desirable, the ultimate use of which is to enhance the comfort of human beings. For example, it is desirable to provide a chair or seat, the immediate surroundings of which can be selectively cooled or heated, and yet the modified effect cannot be noted to any substantial extent beyond that range.

It is also desirable to provide an individualized climate control for an occupant seat so that substantially instantaneous heating or cooling can be achieved. For example, an automotive vehicle exposed to the summer weather, where the vehicle has been parked in an unshaded area for a long period of time, can cause the vehicle seat to be very hot and uncomfortable for the occupant for some time after entering and using the vehicle, even with normal air conditioning. Even with normal air-conditioning, on a hot day, the seat occupant's back and other pressure points may remain sweaty while seated. Also, in the winter time, it is highly desirable to have the ability to quickly warm the seat of the occupant to facilitate the occupant's comfort, especially where the normal vehicle heater is unlikely to warm the vehicle's interior as quickly. For such reasons, there has long been a desire for a seat which provides for the comfort of human beings primarily by cooling or heating the occupant, as desired by the user.

One technique employed to attempt to provide occupant individualized comfort has been to use seating which either warms or cools the occupant via conduction. This embodiment requires a number of currently non-standard components, such as specialized coil spring elements specifically configured for heat transfer, multiple layers of material to enclose the non-standard coil springs, and additional air flow barrier layers.

One limitation of this embodiment is that it does not use common elements presently available that can be used to construct vehicle seats. While this embodiment provides some heating and cooling, it nevertheless does not achieve optimal operation without sacrifice of the comfort of the user. Also, excessive accumulation of condensate can occur, with the potential of spilling and damaging the vehicle in the vicinity of the seat.

Yet another technique employed to provide localized heating and cooling of an occupant has been to alter the above technique by allowing some of the conditioned air to escape the confines of the seat in order to provide some convection cooling or heating of the occupant. However, the same problems of non standard and specialized parts remains. For example, non-standard oval helically wound metal wire springs or molded plastic tubes, and a bladder-type containment layer for specialized fluids to facilitate the heat transfer are used. Other non-standard parts can include metal wire plenum coils or layers of copper or aluminum cloth. Yet another non-standard part that may be used in the seat construction is a pair of plastic sheets in facing relationship and heat sealed at a number of points and that also requires a Fluorinert liquid in order to provide for high thermal transfer properties. A condensate collection system is preferably needed along with the air conditioning unit, requiring more complex parts and maintenance. If the condensate collection system were not provided, then undue liquid accumulation would occur within the main exchanger housing for conditioned air. This is undesirable because excessive condensate accumulation reduces the main exchanger performance.

Further problems with the techniques available are that the air conditioning supply units and their accompanying condensate collection systems may require additional wiring apparatus. This includes requiring electrical cabling that is plugged into the cigarette lighter socket of an automobile in order to power the equipment.

Other problems that have been experienced with existing techniques include that the construction of the seats are not easily integratable into existing seat construction methods. The techniques require a significantly greater number of parts as compared to existing automotive seats, and often require non-standard parts. The parts used are typically more complex than other existing air distribution methods. In the past, this has lead to increased costs if individualized occupant cooling was provided. Also, the mechanical comfort of the seat is appreciably affected in the techniques employed, as compared to the comfort provided by standard automotive seats, wherein the user is able to distinguish between the comfort of the two. Further, the current techniques are problematic in the ability for vehicle designers to provide modern seating embodiments and stylistic designs. Yet another problem is that the techniques employed above do not provide good insulation for holding conditioned air until it is used by the occupant.

Therefore, it is desirable to provide a simple construction of a vehicle occupant seat which requires little, if any, non-standard parts and which utilizes commonly available materials. It is contemplated that a simple seat construction can be utilized as an automobile seat or other such seating embodiment where the occupant desires to be at a different environmental comfort zone than the surrounding users of the vehicle, room or office. The amount of conditioned air is modest because the area to be cooled or heated is relatively small and localized so that it will not disturb others in the vehicle or room.

SUMMARY OF THE INVENTION

The present invention relates to an improved method and apparatus for providing conditioned air to the occupant of a vehicle seat without requiring a significant amount of extra parts or increased costs, as compared to a standard vehicle seat. Air distribution to the occupant is provided without having to use exotically designed parts and does not compromise the mechanical comfort of the seat. Further, the invention allows for the use of a plurality of various air conditioning sources.

In an embodiment, the conditioned air is channeled from an inlet to the relative top or seating surface side of the seat cushion through one main channel opening. The air flow then branches off via a single manifold to a plurality of subchannels which travel along the seating surface side of the interior foam cushion. The air then exits the subchannels via a reticulated foam layer. The reticulated foam layer facilitates both perpendicular, as well as parallel, air flow relative to a seating surface side of the foam. The air travels to the seat cushion seating surface and exits the seat through an air permeable fabric. Air flow through the seat provides for relatively quick comfort adjustment of the seat's occupant. The air flow can also be used to initially warm up or cool down the seat prior to use by the occupant, if desired.

An alternate embodiment of the invention involves dividing the air into a plurality of main channels on the bottom of the interior foam seat cushion, where the bottom represents the surface opposite the occupant seating surface. The air then enters a plurality of local manifolds, travels to the top surface of the interior foam cushion, and exits the manifold along a plurality of subchannels. Each group of subchannels preferably service a single manifold. The air then travels along the top surface of the seating cushion and is diffused through a layer of reticulated foam and onto the occupant, as previously described.

Other variations of this invention are possible. For example, if desired, a secondary structure may be incorporated into the interior foam cushion to assist supporting the channel side walls, in order to prevent them from crushing under the weight of the seat's occupant.

In yet another alternate embodiment, the seams that are already present in the seat can be utilized as either primary or secondary channels to direct air flow next to the occupant. The sewn seams can be utilized as distribution channels, to supplement or replace the reticulated foam layer. Air distribution is accomplished through the seat's sewn seams to direct air to the occupant from the channels or subchannels. The seams have the advantage of eliminating any barriers of fabric and allowing the air to flow so that it will be in direct contact with the occupant.

The invention is easily integratable into existing seat construction methods. In a preferred embodiment, the invention requires substantially the same number of parts as existing automotive seats. Using less parts and complexity than previous air distribution techniques results in a lower cost to utilize this invention. Further, the mechanical comfort of the seat is not appreciably affected, as generally the same basic types of materials that are used in vehicle seats today are utilized for the air distribution method and apparatus. The seat styling and design are also not appreciably changed. Finally, the inherent tendencies of the existing foam construction of vehicle seats is a good insulator for holding and maintaining the conditioned air until it is delivered to the seat occupant. This achieves maximum comfort levels, that this invention provides in a very energy efficient mode, while requiring no complex systems or devices in order to practice this invention.

BRIEF DESCRIPTION OF THE DRAWINGS

These and other features, aspects, and advantages of the present invention will be appreciated as the same become better understood by reference to the following detailed description when considered in connection with the accompanying drawings, wherein:

*FIG. 5a is a sectional view of another embodiment of the air plenum strengthening method;*

DETAILED DESCRIPTION

Figures 1, 4, 5:
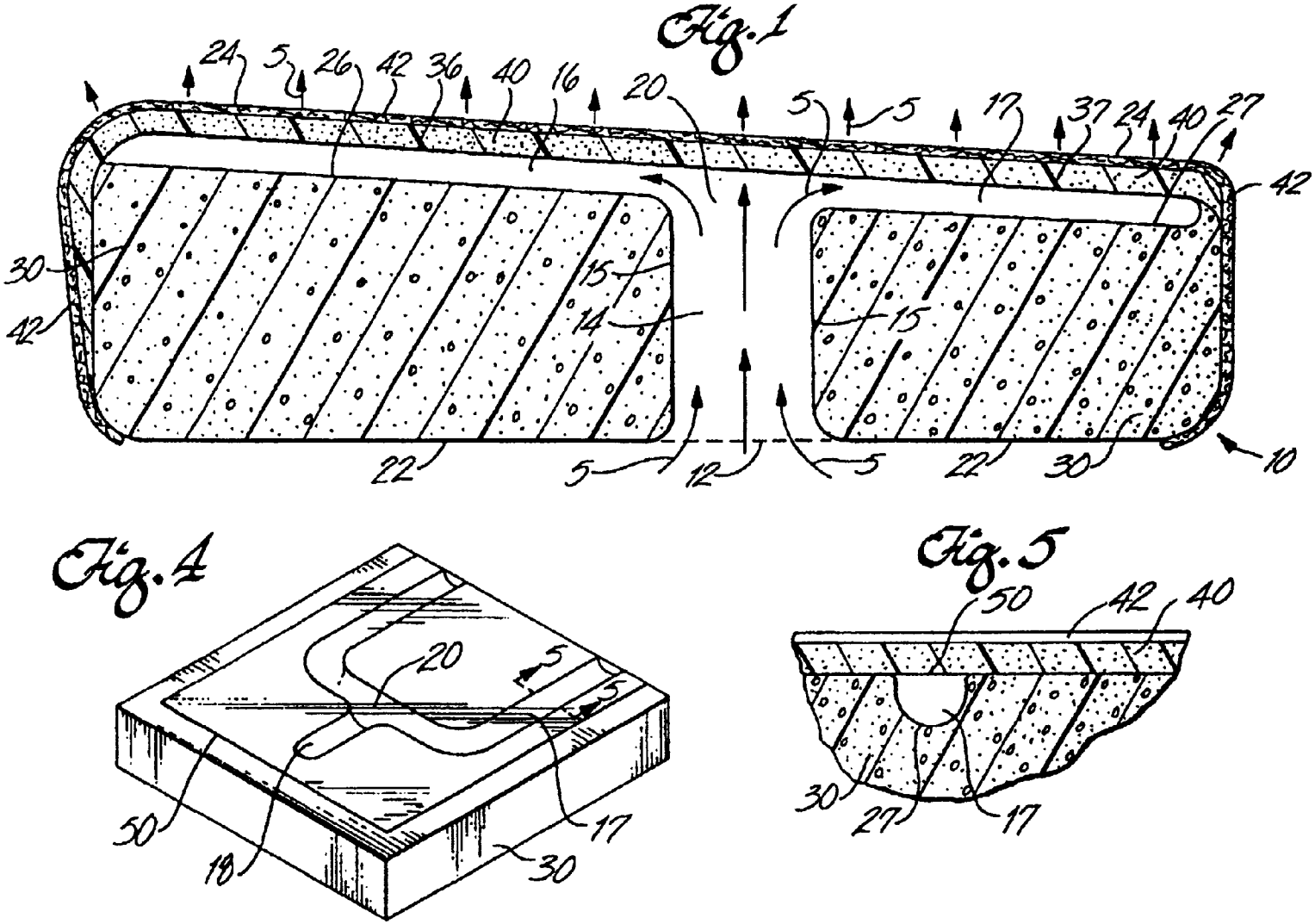
FIG. 1 is a sectional view of the air plenums of the seat cushion.
FIG. 4 is a perspective view of yet another air plenum embodiment, wherein the seat covering is not shown for clarity and which illustrates a method for reinforcing the air plenums.
FIG. 5 is a sectional view of the air plenum strengthening method as shown in FIG. 4.

In a first embodiment of the invention, conditioned air 5, represented by arrows, is supplied to the air inlet 12 of an automotive seat cushion 10 as shown in FIG. 1. The conditioned air 5 passes through the main channel 14 and is divided via the manifold 20 into subchannels 16, 17, as shown in FIG. 1. The air inlet 12 is located on the entrance side 22, and is opposite the occupant side 24 of the seat cushion 10. The air inlet 12, the channel walls 15, and a portion of the subchannel walls 26, 27 are substantially formed by standard automotive seat cushion foam material 30. The subchannel walls 36, 37 nearest the occupant side 24 of the seat cushion 10 preferably are formed by reticulated foam 40. The reticulated foam is encapsulated by a layer of automotive upholstery 42 that is preferably air permeable.

The conditioned air 5 passes from the subchannel regions into the reticulated foam layer 40. Within the reticulated foam, the conditioned air is free to move both vertically and horizontally relative to the occupant side 24 of the seat cushion 10. The conditioned air then exits the reticulated foam through the automotive upholstery to impinge the occupant, wherein the occupant is in close proximity to the occupant side 24 of the cushion 10. In this manner, the occupant is heated or cooled, as desired, by the conditioned air.

FIGS. 4 and 5 illustrate an alternate embodiment of the invention. General structural details of the alternate embodiment of FIGS. 4 and 5 are generally similar to the embodiment described in FIG. 1. FIG. 4 shows a perspective view of the channels 16, 17, 18 that have been cut into the foam 30.

The reticulated foam layer 40 and the automotive upholstery layer 42 have been removed from FIG. 4 for clarity. This alternate embodiment provides for a wide piece of adhesive-backed material 50, which forms the occupant side of the subchannel wall 17. In this embodiment, the adhesive-backed material covers the occupant side 24 of the seat cushion foam 30, such that the subchannels 16, 17, 18 are completely covered. The adhesive-backed material is suitably permeable to air, which may include a plurality of perforations, as required, throughout the adhesive-backed material. This allows for air to pass from the subchannels to the reticulated foam 40. The adhesive-backed material assists in resisting the tendency of the subchannels to crush when the occupant is seated upon the cushion.

The adhesive-backed material may also provide for additional occupant comfort. For example, the adhesive-backed material assists in making the subchannels substantially unnoticeable to the occupant's hand when feeling the seat. The subchannels are unnoticeable because the channels are structurally covered by the adhesive-backed material. Therefore, for example, the penetration by a hand into the sub-channels, and penetration of the reticulated foam layer and seat covering into the subchannels when depressed by the occupant or the occupant's hand, is prevented. This provides a structural benefit as well as an aesthetic one, wherein the adhesive-backed material assists in the occupant's lack of awareness of the subchannels in the seat cushion.

An alternative embodiment to prevent potential crushing, is that the walls of the channels, manifold, and subchannels formed by the automotive seat cushion foam 30 can be augmented. [The] *As seen in FIG. 5a, the* walls *27* are augmented with, for example, stiffeners or liners *41* placed cooperatively with the walls *27* or affixed to the walls *27*, as desired, in order to provide additional stiffness to the walls *27*. Also, stiffeners can be placed within the cavities of the channels, manifold, and subchannels to resist crushing. The stiffeners *41* would preferably have suitable holes or paths *43* for the air flow to pass through, such that there is not a substantial resistance to air flow.

While the wide perforated or air permeable adhesive-backed material is not preferably used in the practice of this invention, a tape such as the one described, or other alternate materials, may be used. For example, gluing a very porous material, such as a strong cheesecloth-like material, over the subchannels would be another manner of providing extra strength or support to the subchannels. If a adhesive-backed layer is used, it is preferable that it have relatively minimal stretch characteristics, as well as being more porous, relative to the foam seat cushion material 30.

The reticulated foam is preferably polyurethane or the like, with approximately 20 pores per inch (ppi). Other porosities, such as 10 ppi, and 30 or 40 ppi, are also acceptable. Currently, 20 ppi is the preferred foam type, as there is a slight drop off in the breathability of the foam above 20 ppi.

Figure 2:
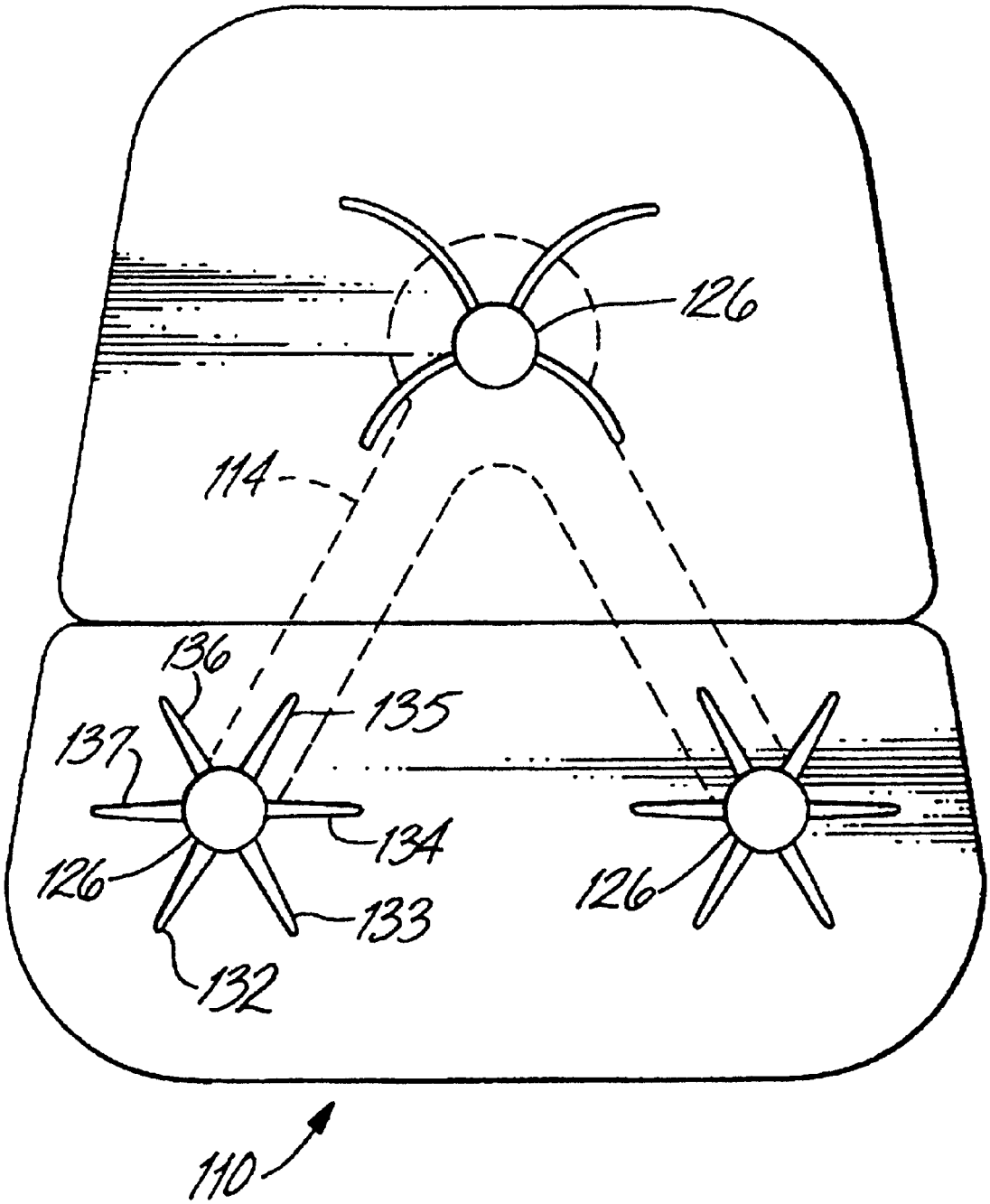
FIG. 2 is a plan view schematic representation of an alternate embodiment of the distribution channels contained in a seat cushion.
Figure 3:
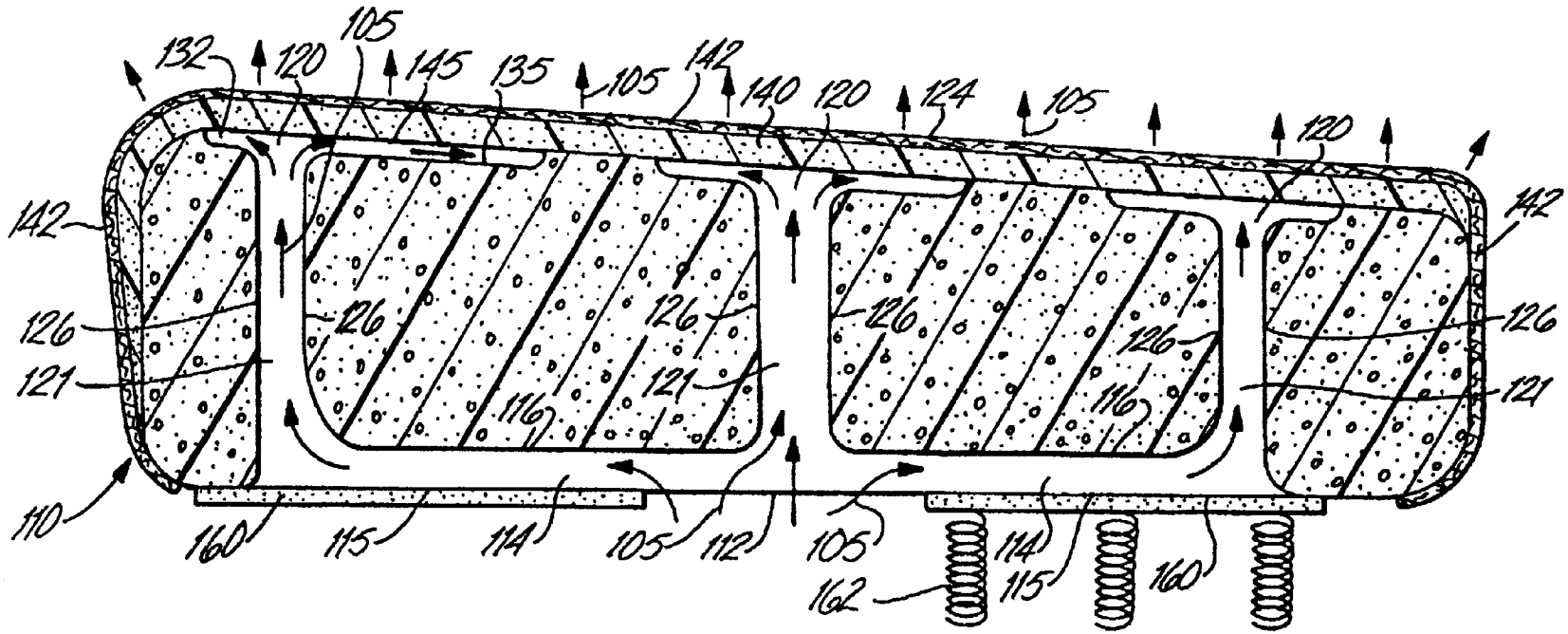
FIG. 3 is a sectional view of the cushion as shown in FIG. 2.

Another alternate embodiment of the invention is shown in FIGS. 2 and 3. This alternate embodiment provides for a different configuration of the air channel distribution system. Conditioned air 105, represented by arrows, enters the seat cushion 110 at air inlet 112. Air is guided along a plurality of lower main channels 114. The lower main channel walls 115 are formed by the surface of a resilient material 160 which separates the seat cushion 110 from the seat cushion springs 162. The upper main channel walls 116 are formed by seat cushion foam material 130. Air is then guided into the respective manifold channels 121. The manifold channel walls 126 are substantially formed by the seat cushion foam 130.

The conditioned air is next directed into the manifold area 120 where the air is further divided into the respective subchannels 132, 133, 134, 135, 136, 137. From this point on, the air travels a path substantially similar the air path described in the first embodiment, i.e., the conditioned air passes through the reticulated foam layer 140 and through the preferably air permeable automotive upholstery 142 in order to cool or heat the occupant.

As in the first embodiment, the automotive upholstery 142 encapsulates the reticulated foam layer 140. The reticulated foam layer forms the occupant side 124 subchannel boundary wall 145 of the respective subchannel 135 and performs a similar wall forming function for the other subchannels.

Figure 6:
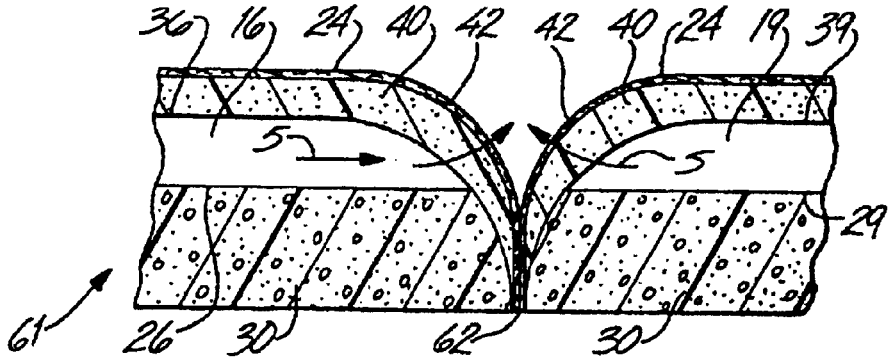
FIG. 6 is a sectional view of an alternate embodiment of providing diffused air from the air plenums to the seat user/occupant.

FIG. 6 shows yet another embodiment in the practice of this invention. Seat cushion foam 30 again forms the lower walls 26, 29 of the subchannels 16, 19. The upper subchannel walls 36, 39, are the part of the subchannel which is in closest proximity to the occupant side 24 of the seat cushion section 61, as shown in FIG. 6. Sewn stitching 62 is used to collapse the reticulated foam layer 40 and the automotive upholstery fabric 42 through the subchannels 16, 19 and into the seat cushion foam 30. By using the stitching 62 to collapse the seat covering, a "valley" 44 is formed in the seat cushion. The valley's convergence is formed by the sewn stitching 62. This valley provides a path for the exiting conditioned air to travel along, in order to provide comfort for the occupant. This valley provides for an additional path for the conditioned air 5 through the reticulated foam layer and the automotive seat covering to the occupant of the seat.

In another alternate embodiment, the reticulated foam layer 40 may be omitted, and the seams 62 used as the primary diffusion areas for directing the conditioned air to the occupant from the subchannels via the valleys. The sewn seam diffusion area, or valley embodiment, may be used with any of the alternate embodiments described in connection with this invention, either with or without foam layers such as the currently preferred reticulated foam layer.

The seat coverings or automotive upholstery used in any of the described embodiments is preferably of an air permeable fabric or synthetic. However, other materials can be used, such as leather. To help facilitate air flow through alternate materials, such as leather, the sewn seam diffusion techniques described can be employed. Preferably, materials such as leather are perforated with small holes, in addition to the stitching holes of the sewn seam diffusion technique, to facilitate the air flow. For example, the holes can be approximately the same size or larger than the holes made by the stitching of automotive seat coverings. In addition, the holes can be used together with the sewn seam diffusion techniques. Alternate sized holes, either larger or smaller, can also be used. However, the smaller the holes, assuming the number of holes remains constant, the more the cooling will rely upon conduction rather than convection for cooling the occupant. As the holes become smaller, the convective air flow is proportionately reduced.

Figure 7:
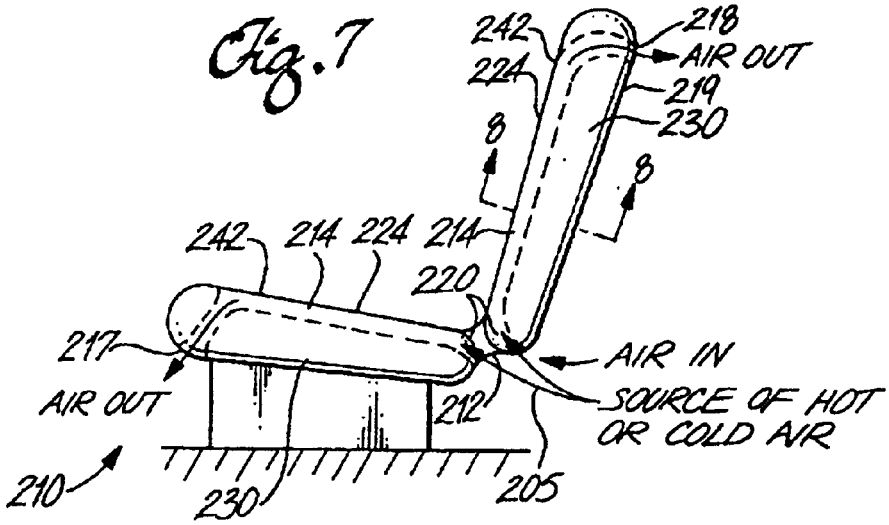
FIG. 7 is a side view schematic representation of one embodiment of the invention illustrating the overall air circulation path.
Figure 8:
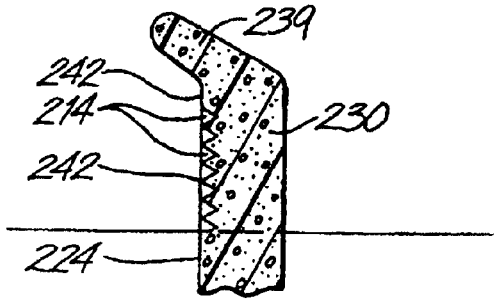
FIG. 8 is a sectional view illustrating the path of air in the interior portion of the seat depicted in FIG. 7.

FIGS. 7 and 8 show yet another alternate embodiment of the invention. As schematically shown in FIG. 7, conditioned air 205, represented by arrows, enters the air inlet 212 of the seat configuration 210. The conditioned air is then divided among a plurality of channels 214 at a manifold area 220. The conditioned air travels along the channels 214 from the manifold area 220 to the foot outlet 217 or the head outlet 218. As shown in FIG. 7, the foot outlet 217 exhausts near the occupant's feet. However, the head outlet 218 exhausts out the "back", or non-occupant side of the seat. Alternately, the seat may provide for a head outlet that exhausts on the occupant side 224, preferably near the neck area of the occupant. In this alternate embodiment, air exiting at the head and foot outlets facilitate cooling in these respective locations of an occupant that is in close proximity to the occupant side 224.

Conditioned air 205 is able to cool the occupant of the seat, via an air flow path through the seat fabric, as well. Conditioned air traveling via the channels 214 is directed at and near the occupant through an air permeable seat covering 242. A reticulated foam layer is omitted in this embodiment, though it can be added, if desired.

FIG. 8 shows a plurality of air channels 214 which are formed in the seat cushion foam 230. This sectional view also shows a side support "wing" 239 of the seat, wherein the air channels do not occupy this region of the seat cushion foam. However, in an alternate embodiment, the channels can extend even into these areas of the seat, if desired.

Figure 9:
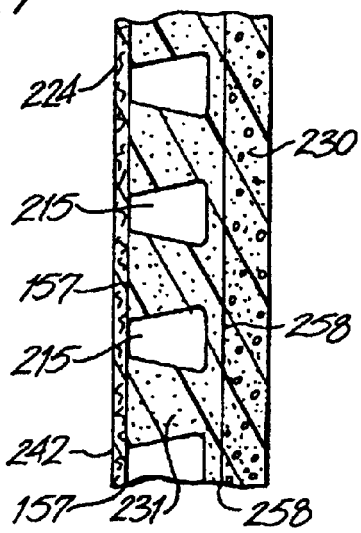
FIG. 9 is an alternate embodiment of the internal air flow path of the seat embodiment as shown in FIG. 7.

Yet another embodiment of the foam air distribution channels as schematically shown in FIG. 7 is shown in FIG. 9. Here the foam seat cushion 230 is of a foam density which is less than the foam density of the air channel forming foam 231. Air channels 215 formed by the denser air channel foam 231, cooperating with the automotive upholstery 242, is used in place of the air channels 214 as schematically shown in FIG. 7. An adhesive may be used to bond the automotive upholstery 242 to the air channel foam 231 at bond line 157. A relatively non-permeable barrier 258, constructed of a synthetic material, can be placed between the air channel foam 231 and the seat cushion foam 230 to provide for a pneumatic, moisture, or thermal barrier, as desired.

Figure 10A:
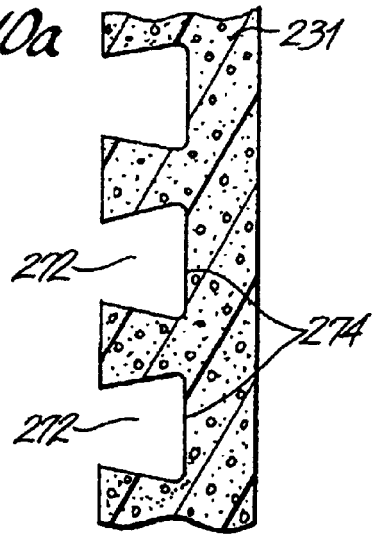
FIG. 10A is a top sectional view of yet another alternate embodiment of the internal air flow path of the seat embodiment as shown in FIG. 7.
Figure 10B:
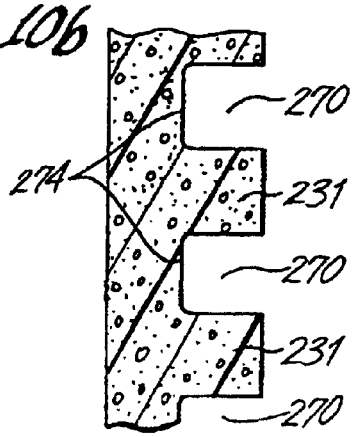
FIG. 10B is a side sectional view of the alternate embodiment of the internal air flow path of the seat embodiment as shown in FIG. 10A.

Another embodiment of the denser air channel foam 231 of FIG. 9 is shown in FIGS. 10A and 10B. Inlet conditioned air is supplied to a first plurality of channels 270, which are oriented relatively perpendicular to the plurality of channels 214, 215 as previously shown in FIGS. 7, 8, and 9, and are also perpendicular to the second plurality of channels 272, as shown in FIG. 10A. The second plurality of channels 272 are oriented substantially similar to the plurality of channels as shown in FIGS. 7, 8, and 9. Channels 270 cooperate with channels 272, such that the conditioned air is able to pass from the first plurality of channels 270 to the second plurality of channels 272 via a plurality of overlapping common manifold areas 274. A common manifold area 274 preferably occurs at each intersection of a first channel with a second channel.

The relatively dense air channel forming foam 231 of FIGS. 10A and 10B can be substituted for the foam 231 as shown in FIG. 9, and may be used with or without the non-permeable barriers, as well as with or without the adhesive layers. The permeable automotive upholstery can be augmented or replaced, as desired, with a stitching embodiment as an air flow path to the occupant, as previously described.

The air channel forming foam 231 of the embodiments shown in FIGS. 9, 10A, and 10B is preferably approximately 12 pounds per cubic foot and the seat cushion 230 foam is preferably approximately 6 pounds per cubic foot. However, other foam densities can be substituted for either type of foam, and other materials can be substituted for the various foam types. Any of the foam or foam-like materials described may be suitably cut, laser sculpted, molded, injected, stitched, glued, bonded or other such techniques as are known, in order to achieve the shapes desired to practice this invention.

If desired, an alternate embodiment of the seat as shown in FIG. 1 can be constructed for use in, for example, public transportation systems, such as a subway, bus, or other passenger-carrying vehicle. The seat's foam 30 of FIG. 1 is replaced with a substantially stiff material, such as fiberglass reinforced ABS. The stiff "cushion" member preferably has air channels molded or cut into its structure. At least partially encapsulating the stiff "cushion" member is a substantially resilient member, preferably formed of a reticulated foam layer or the like. If desired, an air-permeable structural wall, such as a adhesive tape with holes, or a plastic screen with holes, can be placed between the reticulated foam layer and the stiff cushion or plastic seat. By adding this structural screen or tape, it is more difficult for an occupant to feel the channels in the stiff materials with either their body while they are sitting, or with their hands. This screen acts in a similar manner as the adhesive backed material described previously. The seat arrangement is covered so as to substantially encapsulate the plastic channel cushion, the plastic screen and the reticulated foam, for example, with seat covering material similar to that previously described. The seat components can be assembled via stitching, screwing, bonding, gluing, cutting, and other means of attachment as is known.

The practice of the invention disclosed herein provides an easy and preferable means with which to construct a variable temperature seat. This provides for a convenient manner for environmentally comforting the seat's occupant.

While only preferred embodiments of the invention are described herein in detail, the invention is not limited thereby. It is believed that the advantages and improved results of the invention will be apparent from the foregoing description. It will be apparent that various changes and modifications may be made without departing from the spirit and scope of the invention as sought to be defined in the following claims.

What is claimed:

[1. Apparatus for selectively varying the environmental temperature of a vehicle seat comprising:

a support member in the seat formed from a resilient material, wherein the support member includes:

an integral air flow channel that extends through the support member from a bottom surface to a top surface of the support member, the air flow channel having an inlet at the bottom surface of the support member for receiving temperature conditioned air therein, and further having an outlet at the top surface of the support member for dispensing temperature conditioned air therefrom; and at least one air subchannel integral with and extending along a top surface of the support member, wherein the air subchannel is connected with the outlet of the air flow channel; and a porous member which substantially covers the top surface area of the support member, the porous member having an interface with the air subchannel; and a seat cover that substantially encapsulates the porous member to the support member.]

[2. An apparatus as defined in claim 1 wherein the porous member comprises;

a first porous member that is disposed adjacent and substantially covers the top surface of the support member; and a second porous member substantially encapsulating the first porous member.]

[3. An apparatus for selectively varying the environmental temperature of a vehicle seat comprising:

a seat cushion in the seat formed from a resilient material including:

an integral air flow channel extending vertically therethrough from a top surface of the seat cushion to a bottom surface of the seat cushion, wherein the air flow channel has an inlet adjacent the bottom surface of the seat cushion for receiving temperature conditioned air therein, and further has an outlet adjacent the top surface of the seat cushion for dispensing temperature conditioned air therefrom; and a porous member which substantially covers the top surface area of the seat cushion;

at least one air subchannel that is integral with and extends along the top surface of the seat cushion, wherein the air subchannel is connected with the outlet of the air flow channel, and wherein the porous member is contact with the air subchannel; and a seat covering substantially encapsulating the porous member to the seat cushion.]

[4. An apparatus for selectively varying the environmental temperature of a vehicle seat comprising:

a seat cushion in the seat formed from a resilient material including:

an integral air flow channel extending vertically therethrough from a top surface of the seat cushion to a bottom surface of the seat cushion, wherein the air flow channel has an inlet adjacent the bottom surface of the seat cushion for receiving temperature conditioned air therein, and further has an outlet adjacent the top surface of the seat cushion for dispensing temperature conditioned air therefrom; and a porous member which substantially covers the top surface area of the seat cushion;

at least one air subchannel that is integral with and extends along the top surface of the seat cushion, wherein the air subchannel is connected with the outlet of the air flow channel, and wherein the porous member is contact with the air subchannel;

an air manifold integral with and extending along the top surface of the seat cushion, wherein the air manifold is interposed between the outlet of the air flow channel and the air subchannel to facilitate the distribution of temperature conditioned air therebetween; and a seat covering substantially encapsulating the porous member to the seat cushion.]

[5. Apparatus for selectively varying the environmental temperature of a vehicle seat comprising:

a support member in the seat in the form of a resilient cushion, wherein the support member includes:

an air flow channel integral with the support member and extending therethrough from a bottom surface to a top surface of the support member, wherein the air flow channel has an inlet at the bottom surface for receiving temperature conditioned air, and an outlet at the top surface for dispensing temperature conditioned air, at least one air subchannel integral with and extending along the top surface of the support member; and an air manifold integral with and extending along the top outer surface of the support member between the air flow channel outlet and the air subchannel for dispersing temperature conditioned air from the air flow channel to the air subchannel; and a flexible porous member disposed over the top surface of the support member and having an interface with the air subchannel; and a flexible seat cover substantially encapsulating an outer surface of the flexible porous member.]

[6. The apparatus as recited in claim 5 wherein the resilient cushion can be selected from the group of materials consisting of cellular spongy material, foam, and fiberglass reinforced plastic.]

[7. The apparatus as recited in claim 5 wherein the flexible porous member comprises:

a first porous member substantially covering the top surface of the support member and having an interface with the air subchannels; and a second porous member substantially encapsulating the first porous member.]

[8. A method for selectively varying the environmental temperature of a vehicle seat comprising the steps of:

routing temperature conditioned air from an air inlet to an air outlet of an air flow channel extending through a support member of the seat;

distributing temperature conditioned air from the air outlet along a top surface of the support member through at least one air subchannel disposed within the top surface;

passing temperature conditioned air from the air subchannels through a porous member disposed adjacent the outer surface, and then to a seat covering disposed adjacent the porous member.]

[9. A method as recited in claim 8 wherein the temperature conditioned air is routed from a bottom surface of the support member to a top surface of the support member.]

*10. A method for selectively varying the environmental temperature of a vehicle seat, comprising the steps of:*

*routing temperature-conditioned air from an air inlet to an air outlet of an airflow channel extending through a support member of the seat;*

*distributing temperature conditioned air from the air outlet along a top surface of the support member through at least one air subchannel disposed within the top surface;*

*passing the air through an air-porous member disposed adjacent the top surface of the support member and over the at least one air subchannel, through an intermediate layer interposed between the support member and the air-porous member, and away from an air-impermeable barrier located on a side of the air subchannel opposite the air-porous member; and*

*passing temperature-conditioned air from the air subchannels through the porous member and subsequently to a seat covering adjacent the air-porous member and substantially encapsulating the air-porous member to the support member.*

*11. The method as recited in claim 10, wherein the temperature-conditioned air is routed from a bottom surface of the support member to a top surface of the support member.*

*12. A method as recited in claim 10, wherein the support member comprises a resilient material, and the air-porous member comprises a layer of air-permeable support material which is selected to be substantially less stretchable than the resilient material of the support member.*

*13. A method as recited in claim 10, wherein the air-porous member has a plurality of holes and the air passes through the holes.*

*14. A method as recited in claim 10, wherein the air-porous member is adhered to the support member so that the air-porous member helps to resist collapse and blockage of the air subchannel as air passes therethrough.*

*15. A method as recited in claim 10, wherein the intermediate layer is selected to comprise a structural screen mak-*

*ing it difficult for a seat occupant to feel the channels when the seat occupant is sitting on the seat.*

*16. A method as recited in claim 10, comprising the further step of adhering the air-porous member to the support member.*

*17. A method for selectively varying the environmental temperature of a vehicle seat, comprising the steps of:*

*routing temperature-conditioned air from an air inlet to an air outlet of an airflow channel extending through a support member of the vehicle seat;*

*distributing temperature-conditioned air from the air outlet along a top surface of the support member through at least one air subchannel disposed within the top surface;*

*placing a liner in the air subchannel to resist crushing of the air subchannel when the weight of a seat occupant is placed on the support member and the air subchannel;*

*passing the air through an air-porous member disposed adjacent the top surface of the support member and over the at least one air subchannel; and*

*passing temperature-conditioned air from the air subchannels through the porous member and subsequently to a seat covering adjacent the air-porous member and substantially encapsulating the air-porous member to the support member.*

*18. A method as recited in claim 17, comprising the further step of passing air through the liner to the air-porous member.*

*19. A method as recited in claim 18, comprising the further step of affixing the liner to the wall of the air subchannel and passing the temperature-conditioned air through the liner as it is affixed to the wall.*

*20. Apparatus for selectively varying the environmental temperature of a vehicle seat comprising:*

*a support member in the seat formed from a resilient material, wherein the support member includes:*

*an integral air flow channel that extends through the support member from a bottom surface to a top surface of the support member, the air flow channel having an inlet at the bottom surface of the support member for receiving temperature conditioned air therein, and further having an outlet at the top surface of the support member for dispensing temperature conditioned air therefrom;*

*at least one air subchannel that is molded or formed in the support member and extends adjacent the top surface of the support member, wherein the air subchannel is connected with the outlet of the air flow channel; and*

*an air-impermeable barrier on a side of the air subchannel opposite the top surface of the support member;*

*a porous member which substantially covers the top surface area of the support member, the porous member having an interface with the air subchannel; and*

*a seat cover that substantially encapsulates the porous member to the support member.*

*21. An apparatus as defined in claim 20 wherein the porous member comprises:*

*a first porous member that is disposed adjacent and substantially covers the top surface of the support member; and*

*a second porous member substantially encapsulating the first porous member.*

*22. An apparatus for selectively varying the environmental temperature of a vehicle seat comprising:*

*a seat cushion in the seat formed from a resilient material including:*

*an integral air flow channel extending vertically therethrough from a top surface of the seat cushion to a bottom surface of the seat cushion, wherein the air flow channel has an inlet adjacent the bottom surface of the seat cushion for receiving temperature conditioned air therein, and further has an outlet adjacent the top surface of the seat cushion for dispensing temperature conditioned air therefrom; and*

*a porous member which substantially covers the top surface area of the seat cushion;*

*at least one air subchannel that is molded or formed in the seat cushion and extends adjacent the top surface of the seat cushion, wherein the air subchannel is connected with the outlet of the air flow channel, and wherein the porous member is contact with the air subchannel;*

*an air-impermeable barrier on a side of the air subchannel opposite the top surface of the support member; and*

*a seat covering substantially encapsulating the porous member to the seat cushion.*

*23. An apparatus for selectively varying the environmental temperature of a vehicle seat comprising:*

*a seat cushion in the seat formed from a resilient material including:*

*an integral air flow channel extending vertically therethrough from a top surface of the seat cushion to a bottom surface of the seat cushion, wherein the air flow channel has an inlet adjacent the bottom surface of the seat cushion for receiving temperature conditioned air therein, and further has an outlet adjacent the top surface of the seat cushion for dispensing temperature conditioned air therefrom; and*

*a porous member which substantially covers the top surface area of the seat cushion;*

*at least one air subchannel that is molded or formed in the seat cushion and extends adjacent the top surface of the seat cushion, wherein the air subchannel is connected with the outlet of the air flow channel, and wherein the porous member is contact with the air subchannel;*

*an air-impermeable barrier on a side of the air subchannel opposite the top surface of the support member;*

*an air manifold integral with and extending along the top surface of the seat cushion, wherein the air manifold is interposed between the outlet of the air flow channel and the air subchannel to facilitate the distribution of temperature conditioned air therebetween; and*

*a seat covering substantially encapsulating the porous member to the seat cushion.*

*24. Apparatus for selectively varying the environmental temperature of a vehicle seat comprising:*

*a support member in the seat in the form of a resilient cushion, wherein the support member includes:*

*an air flow channel integral with the support member and extending therethrough from a bottom surface to a top surface of the support member, wherein the air flow channel has an inlet at the bottom surface for receiving temperature conditioned air, and an outlet at the top surface for dispensing temperature conditioned air;*

*at least one air subchannel that is molded or formed in the support member and extends adjacent the top surface of the support member;*

*an air-impermeable barrier on a side of the air subchannel opposite the top surface of the support member;*

*an air manifold integral with and extending along the top outer surface of the support member between the air flow channel outlet and the air subchannel for dispersing temperature conditioned air from the air flow channel to the air subchannel;*

*a flexible porous member disposed over the top surface of the support member and having an interface with the air subchannel; and*

*a flexible seat cover substantially encapsulating an outer surface of the flexible porous member.*

*25. The apparatus as recited in claim 24 wherein the resilient cushion can be selected from the group of materials consisting of cellular spongy material, foam, and fiberglass reinforced plastic.*

*26. The apparatus as recited in claim 24 wherein the flexible porous member comprises:*

*a first porous member substantially covering the top surface of the support member and having an interface with the air subchannels; and*

*a second porous member substantially encapsulating the first porous member.*

*27. A method for selectively varying the environmental temperature of a vehicle seat comprising the steps of:*

*routing temperature conditioned air from an air inlet to an air outlet of an air flow channel extending through a support member of the seat;*

*distributing temperature conditioned air from the air outlet along a top surface of the support member through at least one air subchannel disposed within the top surface; and*

*passing temperature conditioned air from the air subchannels in a direction opposite an air-impermeable barrier positioned adjacent the air subchannels, through a porous member disposed adjacent the top surface, and then to a seat covering disposed adjacent the porous member.*

*28. A method as recited in claim 27 wherein the temperature conditioned air is routed from a bottom surface of the support member to a top surface of the support member.*

* * * * *

US00RE41765C1

(12) EX PARTE REEXAMINATION CERTIFICATE (9060th)

United States Patent
Gregory et al.

(10) Number: US RE41,765 C1
(45) Certificate Issued: Jun. 12, 2012

(54) VARIABLE TEMPERATURE SEAT

(75) Inventors: Christian T. Gregory, La Crescenta, CA (US); David R. Noles, Los Angeles, CA (US); David F. Gallup, Daly City, CA (US); David H. Heller, Cypress, CA (US)

(73) Assignee: Big Star Investments LLC, Troy, MI (US)

Reexamination Request:
No. 90/011,338, Jan. 24, 2011

Reexamination Certificate for:

| | |
|---|---|
| Patent No.: | **Re. 41,765** |
| Issued: | **Sep. 28, 2010** |
| Appl. No.: | **09/996,439** |
| Filed: | **Nov. 28, 2001** |

Related U.S. Patent Documents

Reissue of:

| | |
|---|---|
| (64) Patent No.: | **5,597,200** |
| Issued: | **Jan. 28, 1997** |
| Appl. No.: | **08/156,562** |
| Filed: | **Nov. 22, 1993** |

Related U.S. Application Data

(63) Continuation of application No. 09/239,054, filed on Jan. 27, 1999, now abandoned.

(51) Int. Cl.
*A47C 7/74* (2006.01)

(52) U.S. Cl. ..... 297/180.13; 297/452.17; 5/653

(58) Field of Classification Search ..... None
See application file for complete search history.

(56) References Cited

To view the complete listing of prior art documents cited during the proceeding for Reexamination Control Number 90/011,338, please refer to the USPTO's public Patent Application Information Retrieval (PAIR) system under the Display References tab.

*Primary Examiner*—Patricia Engle

(57) ABSTRACT

A seating construction with a plurality of plenums into which is received temperature conditioned air. The air passes through the seat via a plurality of channels formed in the foam of the seat cushion. The air then migrates through a reticulated foam layer that is itself covered with an air permeable layer of material. The reticulated foam and stitching of the seat fabric facilitate diffusion of the air from the foam channel conduits. The air then convectively circulates against and near the occupant of the seat to facilitate climate control around the occupant.

At the time of issuance and publication of this certificate, the patent remains subject to pending reissue application number 12/891,664 filed Sep. 27, 2010. The claim content of the patent may be subsequently revised if a reissue patent is issued from the reissue application.

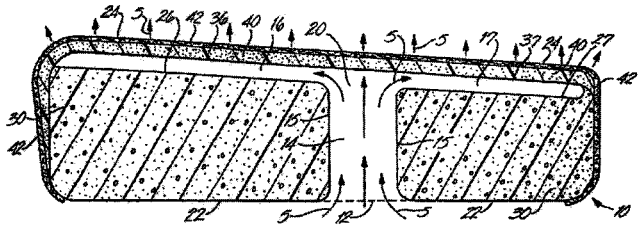

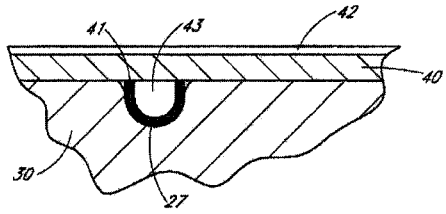

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the original patent but was deleted by the reissue patent; matter printed in italics was added by the reissue patent. Matter enclosed in heavy double brackets [[ ]] appeared in the reissue patent but is deleted by this reexamination certificate; matter printed in boldface is added by this reexamination certificate.

AS A RESULT OF REEXAMINATION, IT HAS BEEN DETERMINED THAT:

The patentability of claims 17-19 is confirmed.

Claims 1-9 were previously cancelled.

Claims 10, 20, 22, 23, 24 and 27 are determined to be patentable as amended.

Claims 11-16, 21, 25, 26 and 28, dependent on an amended claim, are determined to be patentable.

New claims 29-36 are added and determined to be patentable.

*10. A method for selectively varying the environmental temperature of a vehicle seat, comprising the steps of:*

*routing temperature-conditioned air from an air inlet to an air outlet of an airflow channel extending through a support member of the seat;*

*distributing temperature conditioned air from the air outlet along a top surface of the support member through at least one air subchannel disposed within the top surface;*

*passing the air through an air-porous member disposed adjacent the top surface of the support member and over the at least one air subchannel, through an intermediate layer interposed between the support member and the air-porous member, and away from an air-impermeable barrier located on a side of the air subchannel opposite the air-porous member* and positioned within the support member*; and*

*passing temperature-conditioned air from the air subchannels through the porous member and subsequently to a seat covering adjacent the air-porous member and substantially encapsulating the air-porous member to the support member.*

*20. Apparatus for selectively varying the environmental temperature of a vehcile seat comprising:*

*a support member in the seat formed from a resilient material, wherein the support member includes:*

*an integral air flow channel that extends through the support member from a bottom surface to a top surface of the support member, the air flow channel having an inlet at the bottom surface of the support member for receiving temperature conditioned air therein, and further having an outlet at the top surface of the support member for dispensing temperature conditioned air therefrom;*

*at least one air subchannel that is molded or formed in the support member and extend adjacent the top surface of the support member, wherein the air subchannel is connected with the outlet of the air flow channel; and*

*an air-impermeable barrier* within the support member *on a side of the air subchannel opposite the top surface of the support member;*

*a porous member which substantially covers the top surface area of the support member, the porous member having an interface with the air subchannel; and*

*a seat cover that substantially encapsulates the porous member to the support member.*

*22. An apparatus for selectively varying the environmental temperature of a vehicle seat comprising:*

*a seat cushion in the seat formed from a resilient material including:*

*an integral air flow channel extending vertically therethrough from a top surface of the seat cushion to a bottom surface of the seat cushion, wherein the air flow channel has an inlet adjacent the bottom surface of the seat cushion for receiving temperature conditioned air therein, and further has an outlet adjacent the top surface of the seat cushion for dispensing temperature conditioned air therefrom; and*

*a porous member which substantially covers the top surface area of the seat cushion;*

*at least one air subchannel that is molded or formed in the seat cushion and extends adjacent the top surface of the seat cushion, wherein the air subchannel is connected with the outlet of the air flow channel, and wherein the porous member is contact with the air subchannel;*

*an air-impermeable barrier* within the support member *on a side of the air subchannel opposite the top surface of the support member; and*

*a seat covering substantially encapsulating the porous member to the seat cushion.*

*23. An apparatus for selectively varying the environmental temperature of a vehicle seat comprising:*

*a seat cushion in the seat formed from a resilient material including:*

*an integral air flow channel extending vertically therethrough from a top surface of the seat cushion to a bottom surface of the seat cushion, wherein the air flow channel has an inlet adjacent the bottom surface of the seat cushion for receiving temperature conditioned air therein, and further has an outlet adjacent the top surface of the seat cushion for dispensing temperature conditioned air therefrom; and*

*a porous member which substantially covers the top surface area of the seat cushion;*

*at least one air subchannel that is molded or formed in the seat cushion and extends adjacent the top surface of the seat cushion, wherein the air subchannel is connected with the outlet of the air flow channel, and wherein the porous member is contact with the air subchannel;*

*an air-impermeable barrier* within the support member *on a side of the air subchannel opposite the top surface of the support member;*

*an air manifold integral with and extending along the top surface of the seat cushion, wherein the air manifold is interposed between the outlet of the air flow channel and the air subchannel to facilitate the distribution of temperature conditioned air therebetween; and*

*a seat covering substantially encapsulating the porous member to the seat cushion.*

*24. Appartus for selectively varying the environmental temperarture of a vehicle seat comprising:*

*a support member in the seat in the form of a resilient cushion, wherein the support member includes:*

*an air flow channel integral with the support member and extending therethrough from a bottom surface to a top surface of the support member, wherein the air flow channel has an inlet at the bottom surface for receiving temperature conditioned air, and an outlet at the top surface for dispensing temperature conditoned air;*

*at least one air subchannel that is molded or formed in the support member and extends adjacent the top surface of the support member;*

*an air-impermeable barrier on a side of the air subchannel opposite the top surface of the support member* and within the support member*;*

*an air manifold integral with and extending along the top outer surface of the support member between the air flow channel outlet and the air subchannel for dispersing temperature conditioned air from the air flow channel to the air subchannel;*

*a flexible porous member disposed over the top surface of the support member and having an interface with the air subchannel; and*

*a flexible seat cover substantially encapsulating an outer surface of the flexible porous member.*

*27. A method for selectively varying the environmental temperature of a vehicle seat comprising the steps of:*

*routing temperature conditioned air from an air inlet to an air outlet of an airflow channel extending through a support member of the seat;*

*distributing temperature conditioned air from the air outlet along a top surface of the support member through at least one air subchannel disposed within the top surface;* placing a stiffener within the subchannel, the stiffener configured to resist crushing of the subchannel; *and*

*passing temperature conditioned air from the air subchannels in a direction opposite an air-impermeable barrier positioned adjacent the air subchannels, through a porous member disposed adjacent the top surface, and then to a seat covering disposed adjacent the porous member.*

29. A method as recited in claim 27 wherein the stiffener comprises holes or paths for the temperature conditioned air to pass through.

30. A method as recited in claim 29 wherein the holes or paths are configured such that there is not a substantial resistance to the passing of the temperature conditioned air.

31. A method as recited in claim 17, comprising the further step of adhering the air-porous member to the support member.

32. A method as recited in claim 27, comprising the further step of adhering the air-porous member to the support member.

33. A method as recited in claim 17, wherein the step of passing temperature-conditioned air from the air subchannels through the porous member and subsequently to a seat covering adjacent the air-porous member comprises passing the temperature-conditioned air both perpendicular and parallel to the top surface of the support member.

34. A method as recited in claim 27, wherein the step of passing temperature-conditioned air from the air subchannels in a direction opposite an air-impermeable barrier positioned adjacent the air subchannels, through the porous member disposed adjacent the top surface, comprises passing the temperature-conditioned air both perpendicular and parallel to the top surface of the support member.

35. A method as recited in claim 17, comprising the further step of securing the air-porous member to the support member.

36. A method as recited in claim 27, comprising the further step of securing the air-porous member to the support member.

* * * * *